US007088967B2

(12) United States Patent
Hildebrand et al.

(10) Patent No.: US 7,088,967 B2
(45) Date of Patent: Aug. 8, 2006

(54) DATA-COMPENSATING POWER MEASUREMENT

(75) Inventors: Uwe Hildebrand, Erlangen (DE); Erik Scheid, Nürnberg (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 849 days.

(21) Appl. No.: 09/988,667

(22) Filed: Nov. 20, 2001

(65) Prior Publication Data
US 2002/0123363 A1    Sep. 5, 2002

(30) Foreign Application Priority Data
Nov. 21, 2000    (EP) ................... 00124396

(51) Int. Cl.
*H04B 1/04*    (2006.01)
(52) U.S. Cl. ............... 455/126; 455/114.1; 455/115.1; 455/116; 455/117
(58) Field of Classification Search ............ 455/115.1, 455/115.2, 115.3, 121, 127.1, 114.1, 116, 455/117, 126
See application file for complete search history.

(56) References Cited

U.S. PATENT DOCUMENTS

| 5,548,820 | A | * | 8/1996 | Victorin ................. 455/67.14 |
| 5,590,415 | A |   | 12/1996 | Peltola et al. |
| 5,822,725 | A | * | 10/1998 | Komatsu et al. ............ 704/226 |
| 5,839,052 | A | * | 11/1998 | Dean et al. ................. 725/106 |
| 6,029,051 | A | * | 2/2000 | Osterberg et al. ........ 455/115.1 |
| 6,091,941 | A |   | 7/2000 | Moriyama et al. |
| 6,424,216 | B1 | * | 7/2002 | Mu et al. ................. 330/207 P |
| 6,507,243 | B1 | * | 1/2003 | Harris et al. ................ 330/129 |
| 6,594,508 | B1 | * | 7/2003 | Ketonen ..................... 455/561 |
| 6,643,520 | B1 | * | 11/2003 | Park et al. ................... 455/522 |
| 2002/0149518 | A1 | * | 10/2002 | Haataja et al. .............. 342/458 |
| 2004/0258024 | A1 | * | 12/2004 | Tiedemann et al. ......... 370/332 |

FOREIGN PATENT DOCUMENTS

| EP | 844485 A2 | 5/1998 |
| WO | WO94/24576 | 10/1994 |

* cited by examiner

*Primary Examiner*—Duc Nguyen
*Assistant Examiner*—Tuan Pham
(74) *Attorney, Agent, or Firm*—Roger Burleigh

(57) ABSTRACT

A method and a device for compensating a data-dependency of a power measurement caused by linear modulation is described. The method comprises performing a first measurement (160) of a transmitted output power and performing a second measurement (160) of a reflected power, wherein the second measurement is performed time multiplexed from said first measurement. The method further comprises calculating (171) a first average power based on data transmitted during the first measurement, calculating a second average power based on data transmitted during the second measurement, and compensating (171) at least one of the first measurement and second measurement based on a difference between the first average power and the second average power.

27 Claims, 5 Drawing Sheets

DATA-COMPENSATING POWER MEASUREMENT

BACKGROUND OF THE INVENTION

1. Technical Field

The present invention relates to power measurements for linearly modulated radio frequency signals and more particularly to a method and a device for compensating a data-dependency of a power measurement caused by linear modulation.

2. Discussion of the Prior Art

The condition of radio systems such as mobile phone systems or satellite systems has to be constantly monitored by power measurements to ensure a high quality of transmission and to avoid damages occurring at output stages that resulting from excessively high power levels.

Within current transceiver units in the Global System for Mobile Communications (GSM) base transceiver stations a measurement of the output power ($P_{fwd}$) transmitted via an output port and a separate measurement of the power, which is reflected ($P_{refl}$) at the output port, are performed. $P_{fwd}$ is e.g. measured at the beginning of the useful part of a transmitted Gaussian Minim Shift Keying (GMSK) burst and $P_{refl}$ is e.g. measured at the end of the useful part of the burst. The power measurements are thus performed time multiplexed.

Based on the measured values of $P_{fwd}$ and $P_{refl}$, the condition of the base transceiver station can be assessed, e.g. by calculating the voltage standing wave ratio (VSWR). In WO94/24576 a method for supervising the condition of a transmitter antenna of a radio system based on the VSWR is described. The VSWR is a measurement of impedance mismatch between a transmission line and its load. The higher the ratio, the greater the mismatch. In other words, as the VSWR increases, the transmission quality declines.

The GMSK modulation technique is a non-linear modulation technique which introduces only very small variations of the radio frequency signal envelope during the useful part of the burst. The powers $P_{fwd}$ and $P_{refl}$ are not data dependent and thus can be measured at arbitrary instances in time during a burst. The measurement results can be used directly for the calculation of a the matching VSWR.

Linear modulation techniques insert large variations in output power depending on the sequence of data which are transmitted. The dynamic power range spreads up to 19 dB over the useful part of the burst, as shown in FIG. 5. The measurement of $P_{fwd}$ and $P_{refl}$ during the useful part of the burst does not lead to reliable results for linear modulation technique, due to the data dependency of the output power. The maximum variation in average output power due to linear modulation between the first and the second half of a single burst can attain 2 dB if every symbol is measured and used for calculating the average output power. If less symbols are measured, the maximum variation in average output power might even increase.

These data-dependent fluctuations of the average output power within a single burst may lead to serious problems when assessing the condition of a radio system based on time-multiplexed measurements. If, e.g., the real VSWR and the calculated VSWR differ by 2 dB or more due to the data-dependency of the output power, the system may e.g. conclude that an antenna feeder cable is disconnected and an alarm will erroneously be sent. The inaccuracy of power measurements resulting from the date-dependency of the output power can thus lead to misinterpretations of the result of the VSWR calculation. Even more severe problems can result from misinterpretations of measurements of $P_{fwd}$ since the measured value of $P_{fwd}$ is an important parameter for the correct supervision of the output power in order to avoid damages resulting from excessively high output power levels.

There is, therefore, a need for a method and device for compensating the data-dependency of time multiplexed measurements of $P_{fwd}$ and $P_{refl}$ for linear modulation techniques.

SUMMARY OF THE INVENTION

The present invention satisfies this need by providing a method for compensating a data-dependency of a power measurement caused by linear modulation, comprising performing a first measurement of a transmitted output power, performing a second measurement of a reflected power, wherein the second measurement is performed time multiplexed from said first measurement, calculating a first average power based on data transmitted during the first measurement, calculating a second average power based on data transmitted during the second measurement, and compensating at least one of the first measurement and second measurement based on a difference between the first average power and the second average power.

A device according to the invention for compensating a data-dependency of a power measurement caused by linear modulation comprises a modulator for linearly modulating a data signal, a measurement unit for performing a first measurement of a transmitted output power and a second measurement of a reflected power, wherein the second measurement is performed time multiplexed from said first measurement, and a compensating unit for compensating at least one of the first measurement and second measurement based on a difference between a first average power and a second average power. The device further comprises at least one of a calculating unit for calculating the first average power based on data transmitted during the first measurement and the second average power based on data transmitted during the second measurement and a database for storing a difference between the first average power the second average power.

The invention allows to perform power measurements within arbitrary time windows and independent of the structure of a particular burst. The first and second measurements may be performed prior to, concurrently with or after calculating the first and second output powers depending on whether or not the transmitted data are known prior to the first and second measurements. Preferably, the first and second measurements are integrating measurements or are performed by means of averaging a plurality of single measurements.

According to the invention, the first and second measurements are performed time multiplexed, i.e., during different time windows. Since the first and second measurements are performed time multiplexed, the hardware cost can be reduced because both measurements are preferably performed by e.g. a single measurement ASIC. The invention thus allows the adaptation of conventional power measurement methods and devices which were hitherto used for non-linearly modulated signals to linear modulation techniques like 8-PSK signals.

In GSM, a burst, i.e., a transmission quantum, consists of a plurality of data sequences. The plurality of data sequences comprises a first tail bit sequence, a first user data sequence, a training sequence, a second user date sequence, and a second tail bit sequence. The first measurement and the second measurement can be performed in the user data sequences, in the training sequence or in the tail bit sequences of a burst. Moreover, the first and the second measurement can be performed both in a single burst or in different bursts.

If the first measurement and the second measurement are performed in different bursts, at least one of the measurements is preferably also compensated based on a difference in the configured power level of the different bursts. This takes into account that the output power might not only vary from one burst to another due to the data-dependency of the signal envelope, but also due to changes in the configured power level. If, e.g., the transmission conditions improve from one burst to another, the system may automatically reduce the maximum output power level.

It was pointed out above that the first measurement and the second measurement may be performed in the user data sequences, in the training sequences or in the tail bit sequences. According to a first embodiment of the invention, the first and the second measurements are preformed in different types of data sequences. Therefore, the first measurement may e.g. be performed in a user data sequence and the second measurement may be performed in a tail bit sequence. Other permutations are likewise possible.

According to a second embodiment of the invention, the first measurement and the second measurement are performed within the same type of data sequences. Thus, both the first and the second measurements may e. g. be performed within a single or within different user data sequences and the first average power and the second average power may be calculated based on the user data comprised within the user data sequence or user data sequences. However, the first measurement and the second measurement can also both be performed within a single or, if the configured power levels of the two bursts are known, within different training sequences. The first average power and the second average power can then be calculated based on the training sequence data. Since training sequences comprise standardized data that are known prior to the measurements, the difference between the first average power and the second average power may be calculated prior to the measurements and be stored in a database. Also, the first measurement and the second measurement can both be performed within a single or within different tail bit sequences. If the measurements are performed within different tail bit sequences, the different tail bit sequences can be part of a single burst or of different bursts. The first and the second average power can then be calculated based on the tail bit data.

Preferably, both the first and the second measurements are performed before an output port of e.g. a transceiver unit or a combining and distribution unit. A further component may be connected to the respective output port. This allows to determine the matching of the further component based on a compensated measurement. In order to determine the matching, the VSWR may be calculated. The provision of calculating means for calculating the VSWR is therefore advantageous. The measurements are preferably performed in accordance with specific timing events. Thus, a database for storing the timing events can be provided.

According to the invention, the above method for compensating a data-dependency of a power measurement can also be used for monitoring the condition of a transmitting and receiving path within a transceiver unit. Thus, both the first and the second measurements can be performed within the transceiver unit and preferably between a radio frequency mixer and a power amplifier of the transceiver unit.

The data between the radio frequency mixer and the power amplifier can be routed on the board of the transceiver unit to the receiver. The receiver may then detect the routed data, determine a power level and calculate a bit error rate. The power level can be determined in accordance with the above illustrated method.

BRIEF DESCRIPTION OF THE DRAWINGS

Further aspects and advantages of the invention will become apparent upon reading the following detailed description of preferred embodiments of the invention and upon reference to the drawings in which.

DESCRIPTION OF PREFERRED EMBODIMENTS

Referring now to the accompanying drawings, the preferred embodiments of this invention are described.

Figure 1:
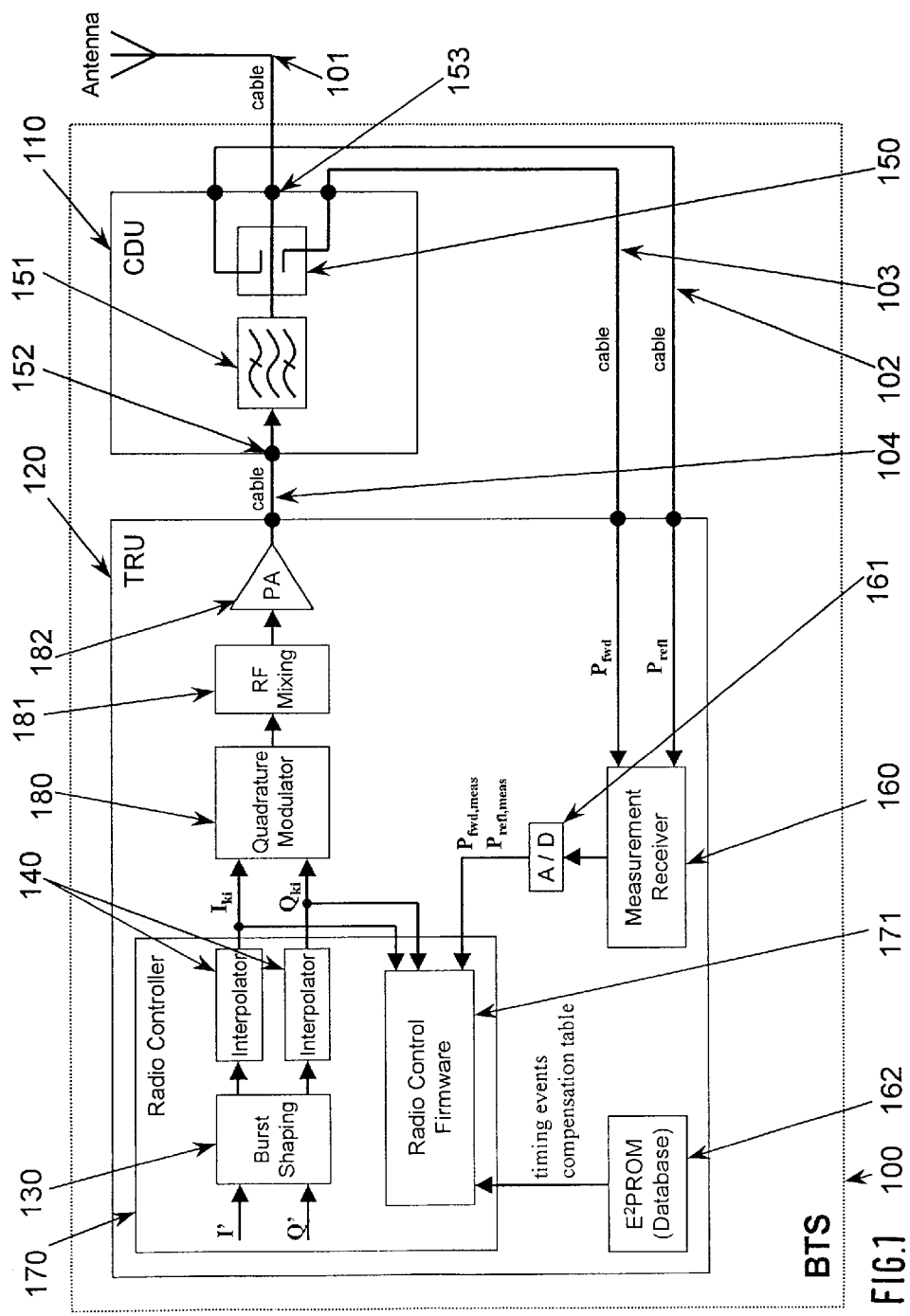
FIG. 1. shows a block diagram of device for compensating a data-dependency of a power measurement caused by linear modulation according to the invention.

In FIG. 1, a schematic diagram of several components of a device for compensating a data-dependency of a power measurement caused by linear modulation within a base transceiver station 100 is illustrated. The base transceiver station 100 is part of a cellular communication system and comprises a transceiver unit 120 in communication with a combining and distribution unit 110, and an antenna 101 in communication with the combining and distribution unit 110.

The combining and distribution unit 110 comprises an input port 152, a TX-bandpass filter 151 for reducing emissions in the side bands, a directional coupler 150, and an output port 153. The transceiver unit 120 comprises a measurement unit in the form of a single measurement receiver 160, a radio controller 170, an analog/digital converter 161, an E-prom chip 162 for storing one or more databases, a quadrature modulator 180, a radio frequency mixer 181, and a power amplifier 182. The measurement receiver 160 comprises a single measurement ASIC not depicted in FIG. 1.

The transceiver unit 120 outputs data to the combining and distribution unit 110 via a cable 104. However, according to a further embodiment not depicted in the figures, the combining and distribution unit 110 may also be used to combine output signals from a plurality of transceiver units 120.

A measurement of the transmitted output power $P_{fwd}$ and a separate measurement of the reflected power $P_{refl}$ is taken before the output port 153 of the combining and distribution unit 110. Alternatively, this measurement may be taken at a connector of the antenna 101 or at an output port of the transceiver unit 120. The transmitted output power $P_{fwd}$ and the reflected power $P_{refl}$ are picked up by the directional coupler 150 and transmitted from the combining and distribution unit 110 to the measurement receiver 160 in the transceiver unit 120 via cables 102, 103.

The measurement receiver 160 may also be located within the combining and distribution unit 120, whereby the transmitted output power $P_{fwd}$ and the reflected power $P_{refl}$ are transmitted to the transceiver unit 120 via a digital bus. If the measurement receiver 160 is located within the combining and distribution unit 120, the digital bus may also be used for transferring a VSWR calculated in the combining and distribution unit 110 to the transceiver unit 120.

The measurement receiver 160 detects the power levels of the transmitted output power $P_{fwd}$ and the reflected power $P_{refl}$. $P_{fwd}$ and $P_{refl}$ can be measured in separate parts of a burst or in different bursts, with knowledge of the configured power level in the current burst. The measured power levels $P_{fwd,meas}$ and $P_{refl,meas}$ are then converted into a digital signal by the analog/digital converter 161 and transmitted to a radio control firmware 171 in the radio controller 170.

As will be described below, the radio control firmware 171 may serve both as a calculating unit for calculating a first average power based on data transmitted during the first measurement and ok a second average power based on data transmitted during the second measurement and as a calculating unit for calculating the VSWR based on the previously calculated first and second average powers. Moreover, the radio control firmware 171 may be used as a compensating unit for compensating at least one of the first measurement and the second measurement based on a difference between the calculated first and second average power.

The radio control firmware 171 may receive data input from the baseband-filterd in-phase ($I_{ik}$) and quadrature-phase ($Q_{ik}$) data bits, the measured power levels $P_{fwd,meas}$ and $P_{refl,meas}$, and timing events from a database stored in the E-prom 162, and may calculate the VSWR as described below in more detail. The baseband-filtered in-phase ($I_{ik}$) and quadrature-phase ($Q_{ik}$) data bits are obtained from the corresponding "hard" bits I' and Q' by burst-shaping in a burst-shaping unit 130 and by interpolation in two parallel interpolaters 140 within the radio controller 170. The timing events stored in the database of the E-prom 162 assign the radio control firmware 171 exact timing points for the measurement of the transmitted output power $P_{fwd}$ and the reflected power $P_{refl}$.

In the following, the method according to the invention for compensating a data-dependency of a power measurement caused by linear modulation within the base transceiver station 100 is described in more detail. As an example, monitoring the condition of the base transceiver station 100 by means of the VSWR is illustrated.

Figure 2:
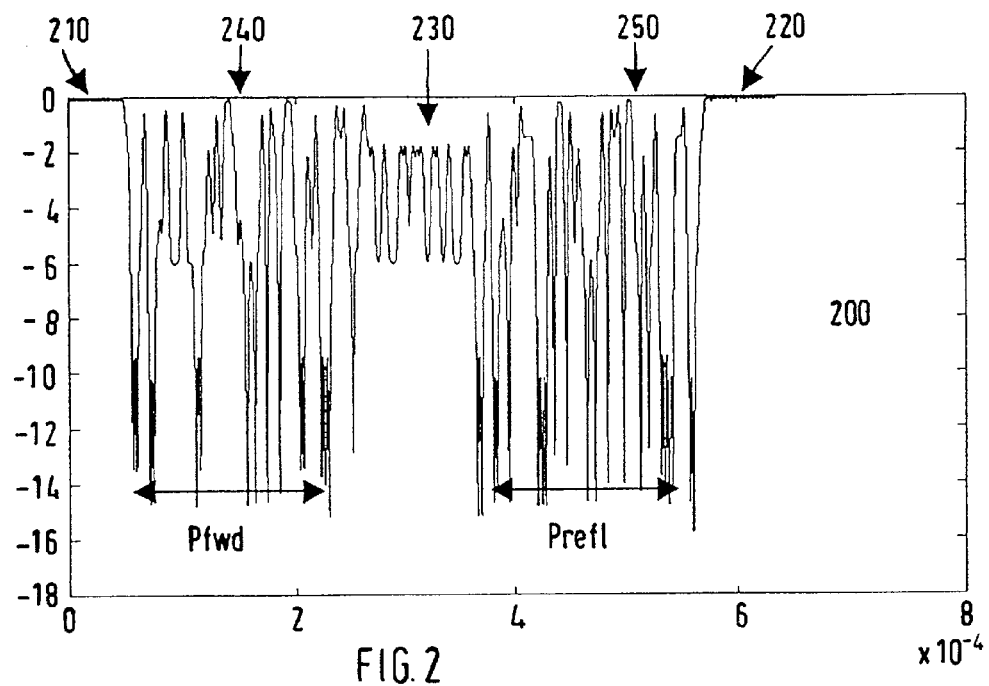
FIG. 2. shows a first graph of a GSM burst.
Figure 3:
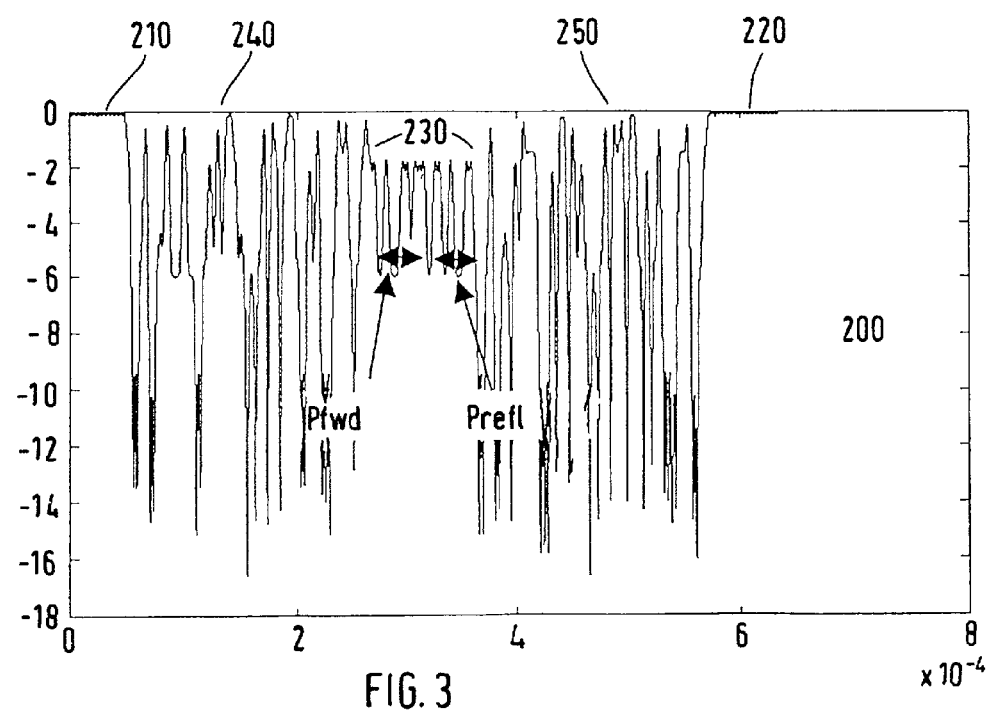
FIG. 3. shows a second graph of a GSM burst.

FIGS. 2 and 3 show two exemplary embodiments according to the invention for measuring $P_{fwd}$ and $P_{refl}$ within a single burst 200 in GSM. In GSM, a burst consists of two tail bit sequences 210, 220, one after power ramping up and the other before power ramping down, a training sequence 230 arranged between the two tail bit sequences 210, 220, and two user data sequences 240, 250. A first user data sequence 240 is arranged between the first tail bit sequence 210 and the training sequence 230 and a second user data sequence 250 is arranged between the training sequence 230 and the second tail bit sequence 220.

According to the measurements depicted in FIG. 2, $P_{fwd}$ and $P_{refl}$ are measured time-multiplexed within the different user data sequences 240, 250. $P_{fwd}$ is measured during a first time window within the first user data sequence 240 and $P_{refl}$ is measured during a second time window within the second user data sequence 250.

Alternatively, $P_{fwd}$ and $P_{refl}$ may be measured during separate time windows within the training sequence 230 as depicted in FIG. 3. The training sequence 230 gives the advantage of putting less stringent requirements on the dynamic range of the measurement receiver 160 because of relatively small power variations of typically 4.5 dB compared to 19 dB during the user data sequences 240, 250 of the burst 200.

In the embodiments depicted in FIGS. 2 and 3, the measurement of $P_{fwd}$ is performed prior to the measurement of $P_{refl}$. Of course, the measurement Of $P_{fwd}$ can also be performed after the measurement of $P_{refl}$.

Besides measuring current values Of $P_{fwd}$ and $P_{refl}$, the average powers during the respective time windows of the measurements of $P_{fwd}$ and $P_{refl}$ have to be determined in order to compensate the data-dependency of $P_{fwd}$ and $P_{refl}$. Generally, the measurement time windows need not to be identical with the averaging time windows.

The average powers can be calculated based on the I and Q data signals. Preferably, the values of the I and Q data after baseband data filtering are used. The arithmetical average of the powers may be calculated by means of different averaging algorithms. One possible averaging algorithm is:

$$P_{out,calci} = 10\log_{10}\left[\frac{1}{N*L} * \sum_{i=1}^{L}\left(\sum_{k=1}^{N}(I_{ki}^2 + Q_{ki}^2)\right)\right]$$

where L is the length of the measured data sequence, i.e., the number of symbols. N is the amount of I and Q data samples after baseband data filtering and calci indicates the average power for the different measurement periods of $P_{fwd}$ and $P_{refl}$. Thus, $P_{out,calc1}$ is the average power corresponding to the measurement of $P_{fwd}$ and $P_{out,calc2}$ is the average power corresponding to the measurement of $P_{refl}$.

Figure 4:
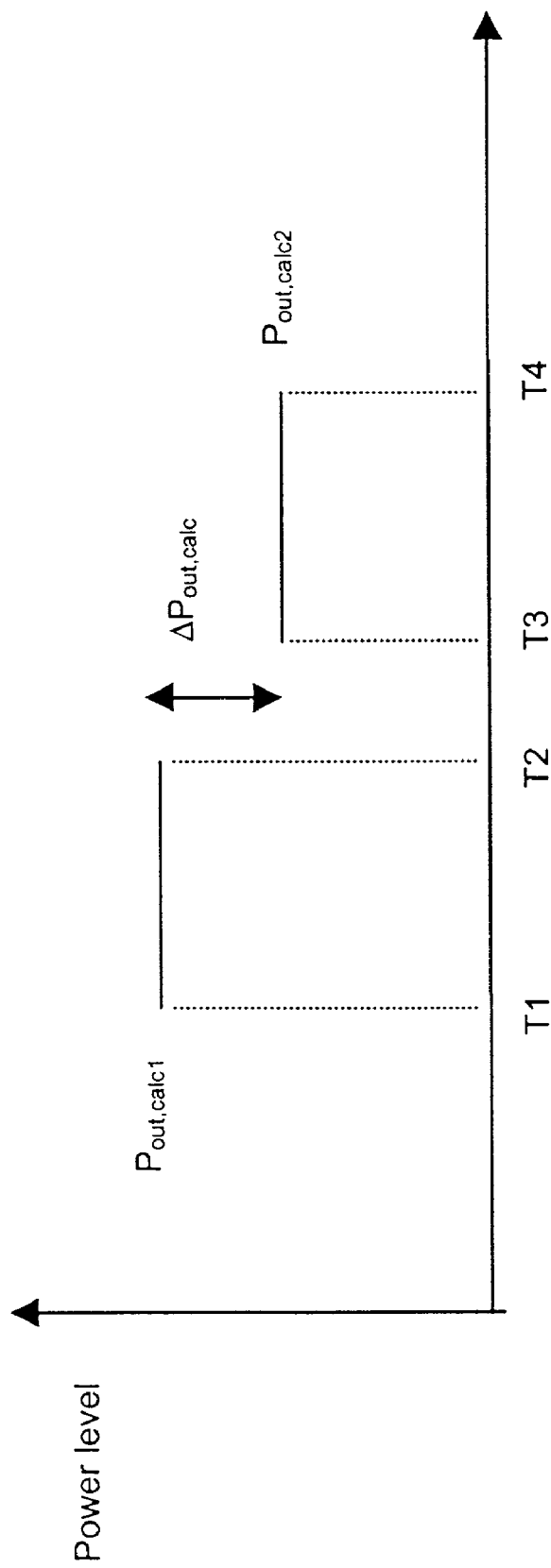
FIG. 4. shows a graph of the power level differences.
Figure 5:
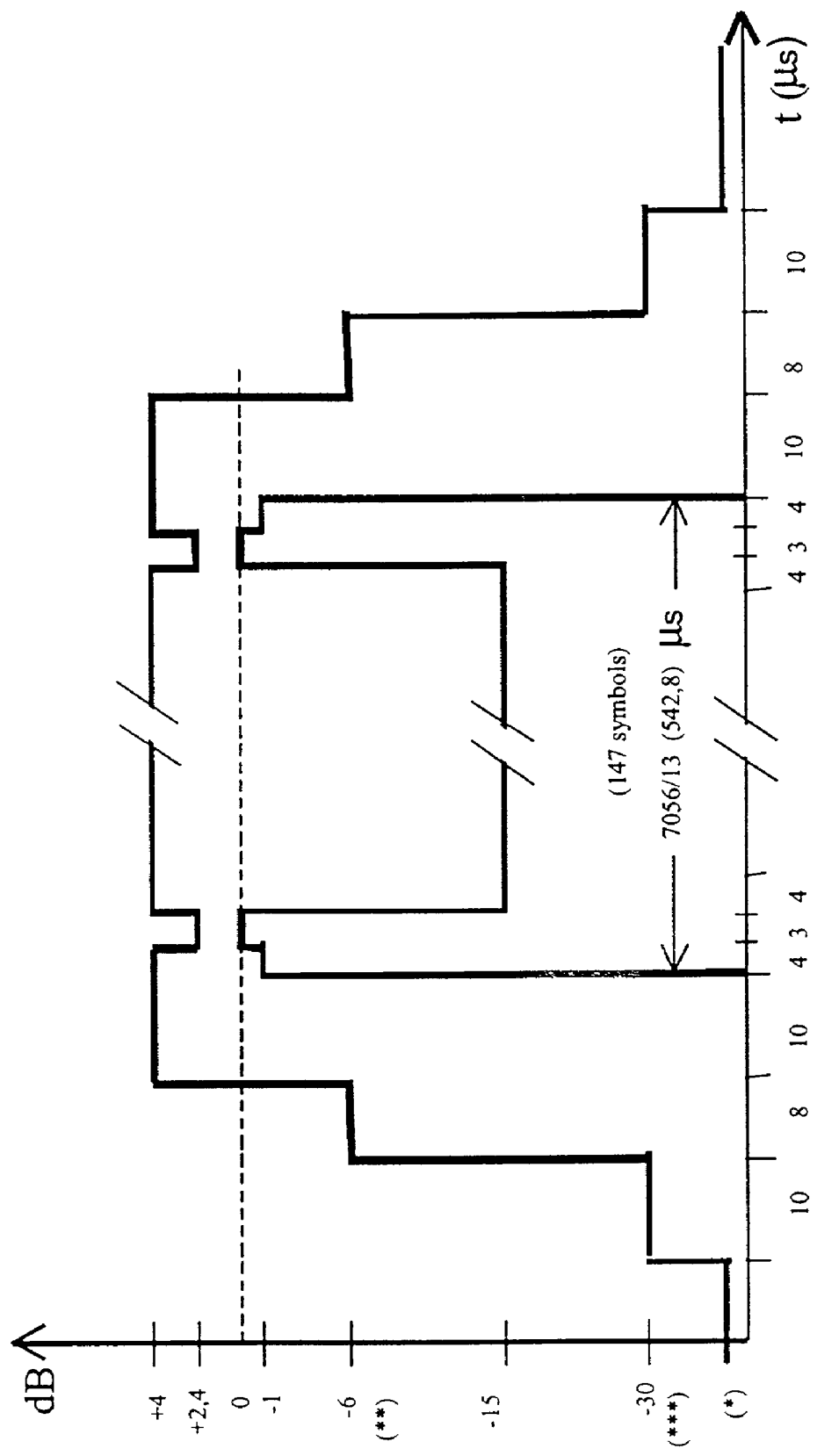
FIG. 5. shows a graph of a linear modulation burst.

The difference $\Delta P_{out,calc}$ in average power during both measurements is then determined by subtracting the average power $P_{out,calc2}$ from the average power $P_{out,calc1}$. A representation of the difference $\Delta P_{out,calc}$ is shown in FIG. 4.

$P_{out,calc1}$ and $P_{out,calc2}$ may be calculated prior to, concurrently with or after the measurement of $P_{fwd}$ and $P_{refl}$. If $P_{out,calc1}$ and $P_{out,calc2}$ are calculated concurrently with or after the measurement of $P_{fwd}$ and $P_{refl}$, the I and Q data bits are received by the radio control firmware 171 on-line as they are output from the radio controller 170, and the radio control firmware 171 calculates $P_{out,calc1}$, $P_{out,calc2}$, and $\Delta P_{out,calc}$ on-line. This on-line calculation can be performed for the measurements depicted in FIG. 2 as well as for the measurements depicted in FIG. 3. In case of on-line calculations, the E-prom 162 depicted in FIG. 1 can be omitted.

The measurements depicted in FIG. 3 allow to calculate $P_{out,calc1}$, $P_{out,calc2}$ and $\Delta P_{out,calc}$ prior to the measurement of $P_{fwd}$ and $P_{refl}$. This is due to the fact that the bit patterns of training sequences, and thus the I and Q data of the training sequences, are standardized and therefore known prior to the production of the TRU 120. In the standard GSM 05.02, e.g., eight different training sequence bit patterns for normal bursts modulated by 8-PSK are defined. The difference $\Delta P_{out,calc}$ can thus be calculated for these bit patterns and stored in a further database in the E-prom 162 during production of the transceiver unit 120. Together with $\Delta P_{out,calc}$, corresponding timing events for the radio control firmware 171 may be stored in a database in the E-prom 162. By means of the timing events it is ensured that $P_{fwd}$ and $P_{refl}$ are measured exactly during the time windows for which the stored value of $\Delta P_{out,calc}$ was calculated.

After $P_{fwd}$ and $P_{refl}$ have been measured, and after $\Delta P_{out,calc}$ has been calculated, the power levels used for calculating the VSWR can be determined by:

$$P_{fwd} = P_{fwd,meas}$$

$$P_{refl} = P_{refl,meas} + \Delta P_{out,calc}$$

Referring to the above equations and FIG. 4, it can be seen that the levels of $P_{out,calc1}$ and $P_{out,calc2}$ differ by $\Delta P_{out,calc}$. If $P_{fwd}$ and $P_{refl}$ have been measured in different bursts, the above equation of $P_{refl}$ has to be corrected by an additive term which takes into account any difference between the configured power levels between the two bursts.

If the $P_{refl,meas}$ is measured between T3 and T4, it is smaller by $\Delta P_{out,calc}$, compared to a measurement between T1 and T2. Consequently, in the exemplary embodiment depicted in FIG. 4, $P_{refl,meas}$ is increased by adding the calculated difference $\Delta P_{out,calc}$.

In reality the calculated power levels are not the same as the measured power levels at the combining and distribution unit 110 output port 150 and the calculated powers will be distorted by an amplification factor a. Therefore, the above equations for $P_{refl}$ and $P_{fwd}$ have to be modified by $$P_{fwd} = P_{fwd,meas} + 10 * \log_{10}(a)$$

$$P_{refl} = P_{refl,meas} + 10 * \log_{10}(a) + \Delta P_{out,calc}$$

Then, the square of the reflection coefficient r is calculated by $$|r|^2 = \frac{P_{refl}}{P_{fwd}}$$

The VSWR, which is calculated in the radio controller 170, is given by $$VSWR = \frac{1 + |r|}{1 - |r|}$$

As already pointed out, the VSWR is a measurement of impedance mismatch between the transmission line and its load. This measurement may be performed before the output port 153 of the combining and distribution unit 110, at an antenna connector itself or at an output port of the transceiver 110. The higher the VSWR, the greater the mismatch. In other words, as the voltage standing wave ratio increases and exceeds a predetermined value, an alarm is triggered signaling, for example, that the antenna 101 of the base transceiver station 100 has been disconnected.

Figure 6:
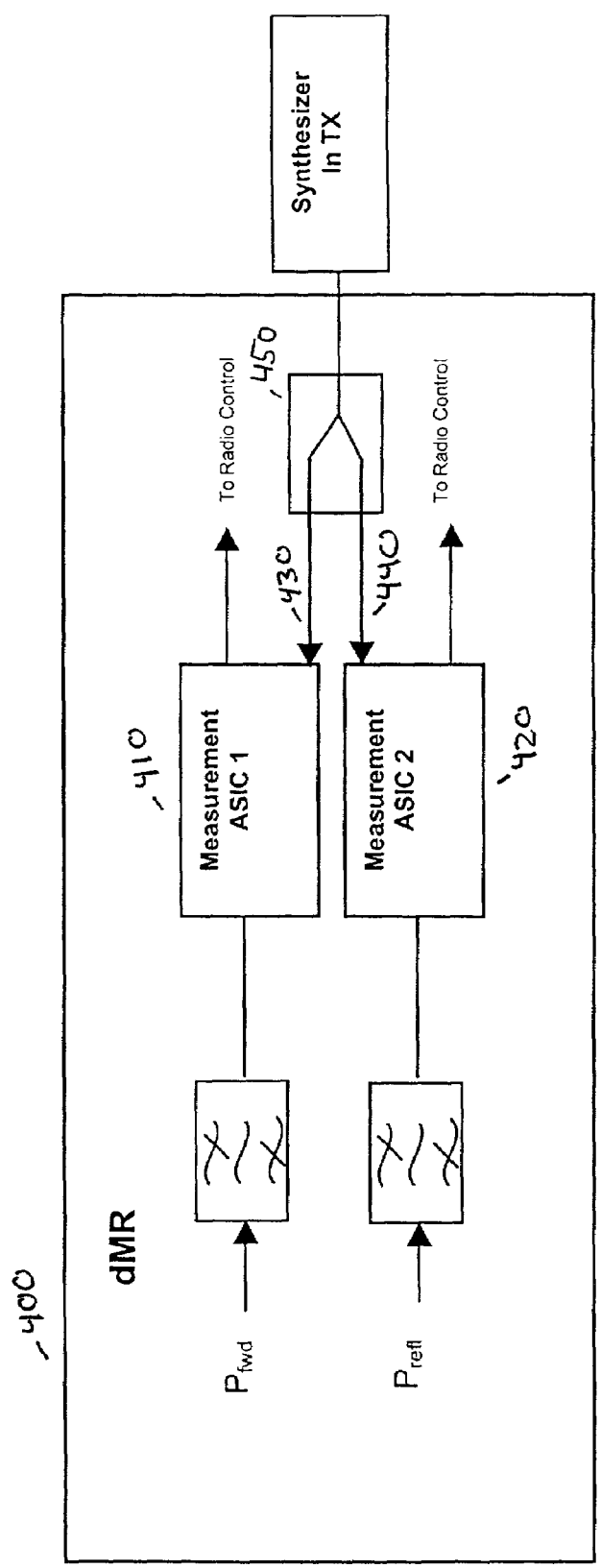
FIG. 6. shows a block diagram of a double measurement receiver.

FIG. 6 shows a further embodiment of a measurement receiver 400 for calculating the VSWR according to the invention in a linear modulation system. Contrary to the measurement receiver 160 depicted in FIG. 1, the double measurement receiver 400 comprises two measurement ASICs 410, 420 in parallel within the double measurement receiver 400. One ASIC 410 performs the $P_{fwd}$ measurement and the other ASIC 420 a time-multiplexed $P_{refl}$ measurement. The double measurement receiver 400 has to be supplied with by a signal splitter 450 with two synthesizer signals 430, 440 for converting the $P_{fwd}$ and $P_{refl}$ signals down.

In the above embodiments, $P_{fwd}$ and $P_{refl}$ have been measured either in a user data sequence or a training sequence. However, although the data-dependency of the signal envelope of the tail bit sequences is small, $P_{fwd}$ and $P_{refl}$ may also be measured in a tail bit sequence.

The invention claimed is:

1. A method for compensating a data-dependency of a power measurement, the data dependency being caused by linear modulation, the method comprising:
    performing a first measurement of a transmitted output power;
    performing a second measurement of a reflected power, wherein the second measurement is performed time multiplexed from the first measurement;
    calculating a first average power based on data transmitted during the first measurement;
    calculating a second average power based on data transmitted during the second measurement; and
    compensating at least one of the first measurement and the second measurement based on a difference between the first average power and the second average power.

2. The method according to claim 1, wherein the first measurement and the second measurement are performed in different bursts.

3. The method according to claim 2, further comprising compensating at least one of the first measurement and the second measurement also based on a difference in the configured power levels between the different bursts.

4. The method according to claim 1, wherein the first measurement and the second measurement are performed in a single burst.

5. The method according to claim 1, wherein the first measurement and the second measurement are performed within a single user data sequence or within different user data sequences.

6. The method according claim 5, wherein the first average power and the second average power are calculated based on user data comprised within the single user data sequence or within the different user data sequences.

7. The method according to claim 1, wherein the first measurement and the second measurement are performed within a single training sequence or within different training sequences.

8. The method according to claim 7, wherein the first average power and the second average power are calculated based on data comprised within the single training sequence or within the different training sequences.

9. The method according to claim 8, wherein the difference between the first average power and the second average power is calculated prior to the first measurement and the second measurement and wherein the difference is stored in a database.

10. The method according to claim 1 wherein the first measurement and the second measurement are performed within a single tail bit sequence or within different tail bit sequences.

11. The method according to claim 10, wherein the first average power and the second average power are calculated based on data comprised within the single tail bit sequence or within the different tail bit sequences.

12. The method according to claim 1, wherein the first measurement and the second measurement are performed within different types of data sequences.

13. The method according to claim 1, wherein the first measurement and the second measurement are performed before an output port.

14. The method according to claim 13, wherein the output port is an output port of a combining and distribution unit or an output port of a transceiver unit.

15. The method according to claim 13, further comprising calculating a matching at the output port based on at least one of the compensated first and second measurements.

16. The method according to claim 1, wherein the first measurement and the second measurement are performed within a transceiver unit.

17. The method according to claim 16, wherein the first measurement and the second measurement are performed between a mixer and an amplifier of the transceiver unit.

18. A computer program product for performing, when the computer program product is run on a computer system, the steps of
performing a first measurement of a transmitted output power;
performing a second measurement of a reflected power, wherein the second measurement is performed time multiplexed from the first measurement;
calculating a first average power based on data transmitted during the first measurement;
calculating a second average power based on data transmitted during the second measurement; and
compensating at least one of the first measurement and the second measurement based on a difference between the first average power and the second average power.

19. The computer program product of claim 18, stored on a computer-readable recording medium.

20. A device for compensating a data-dependency of a power measurement comprising:
a modulator for linearly modulating a data signal;
a measurement unit for performing a first measurement of a transmitted output power and a second measurement of a reflected power, wherein the second measurement is performed time multiplexed from said first measurement;
a first calculating unit for calculating a first average power based on data transmitted during the first measurement and a second average power based on data transmitted during the second measurement; and
a compensating unit for compensating at least one of the first measurement and second measurement based on a difference between the first average power and the second average power.

21. The device according to claim 20, further comprising a database for storing timing events relating to the first measurement and the second measurement.

22. The device according to claim 20, further comprising a second calculating unit for calculating a voltage standing wave ratio.

23. A device for compensating a data-dependency of a power measurement comprising:
a modulator for linearly modulating a data signal;
a measurement unit for performing a first measurement of a transmitted output power and a second measurement of a reflected power, wherein the second measurement is performed time multiplexed from said first measurement;
a first database for storing a difference between a first average power calculated based on data transmitted during the first measurement and a second average power calculated based on data transmitted during the second measurement; and
a compensating unit for compensating at least one of the first measurement and second measurement based on the difference between the first average power ($P_{out, calcl}$) and the second average power.

24. The device according to claim 23, further comprising a second database for storing timing events relating to the first measurement and the second measurement.

25. The device according to claim 23, further comprising a calculating unit for calculating a voltage standing wave ratio.

26. A base transceiver station for a wireless communication system, comprising
a modulator for linearly modulating a data signal;
a measurement unit for performing a first measurement of a transmitted output power and a second measurement of a reflected power, wherein the second measurement is performed time multiplexed from said first measurement;
a unit which provides power information relating to a first average power determined based on data transmitting during the first measurement and a second average power determined based on data transmitted during the second measurement; and
a compensating unit for compensating at least one of the first measurement and the second measurement based on a difference between the first average power and the second average power, wherein the difference is determined based on the power information.

27. A method for compensating a data-dependency of a power measurement, comprising:
linearly modulating and amplifying an input signal to provide an output signal;
performing a first measurement of a transmitted output power of the output signal with a measurement unit;
performing a second measurement of a reflected power of the output signal, wherein the second measurement is performed time multiplexed from the first measurement by the same measurement unit which performed the first measurement;
determining a first average power based on data comprised within the output signal and transmitted during the first measurement;
determining a second average power based on data comprised within the output signal and transmitted during the second measurement;
determining a power difference between the first average power and the second average power; and
compensating at least one of the first measurement and the second measurement based on the power difference.

* * * * *

UNITED STATES PATENT AND TRADEMARK OFFICE
CERTIFICATE OF CORRECTION

PATENT NO. : 7,088,967 B2 Page 1 of 1
APPLICATION NO. : 09/988667
DATED : August 8, 2006
INVENTOR(S) : Hildebrand et al.

It is certified that error appears in the above-identified patent and that said Letters Patent is hereby corrected as shown below:

In Column 1, Line 24, delete "Minim" and insert -- Minimum --, therefor.

In Column 1, Line 65, delete "date-dependency" and insert -- data-dependency --, therefor.

In Column 2, Line 66, delete "date" and insert -- data --, therefor.

In Column 5, Line 17, after "and" delete "ok".

In Column 7, Line 9, delete "$P_{out\text{-}calcl}$" and insert -- $P_{out\text{-}calc\ 1}$ --, therefor.

In Column 10, Line 25, in Claim 26, delete "transmitting" and insert -- transmitted --, therefor.

Signed and Sealed this

Eighteenth Day of December, 2007

JON W. DUDAS
*Director of the United States Patent and Trademark Office*